July 19, 1966  B. K. DENT  3,261,226
REMOTE CONTROL FOR REAR VEIW MIRROR
Filed May 7, 1964  2 Sheets-Sheet 1
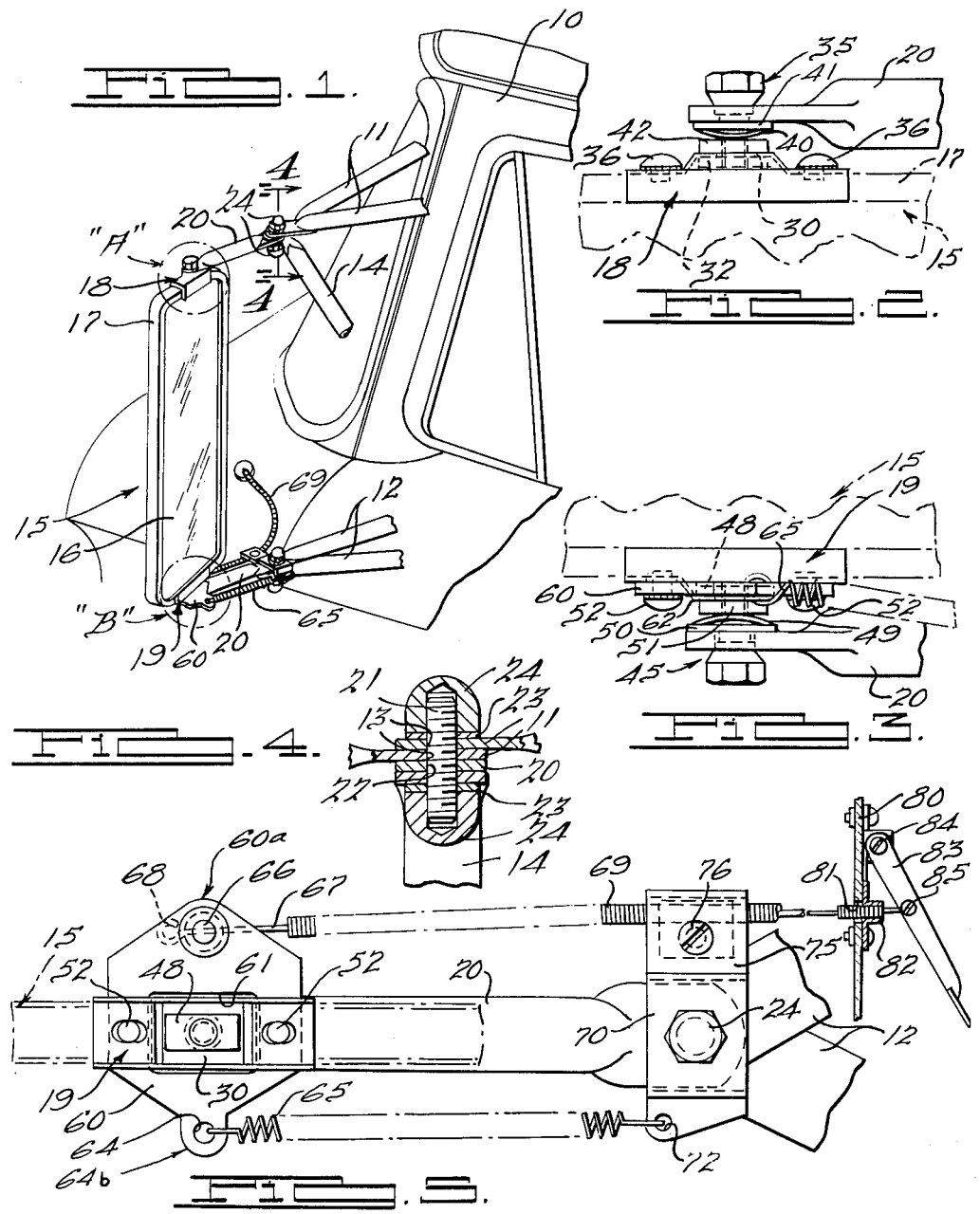
INVENTOR.
Bernard K. Dent.
BY
Harness, Dickey & Pierce
ATTORNEYS.

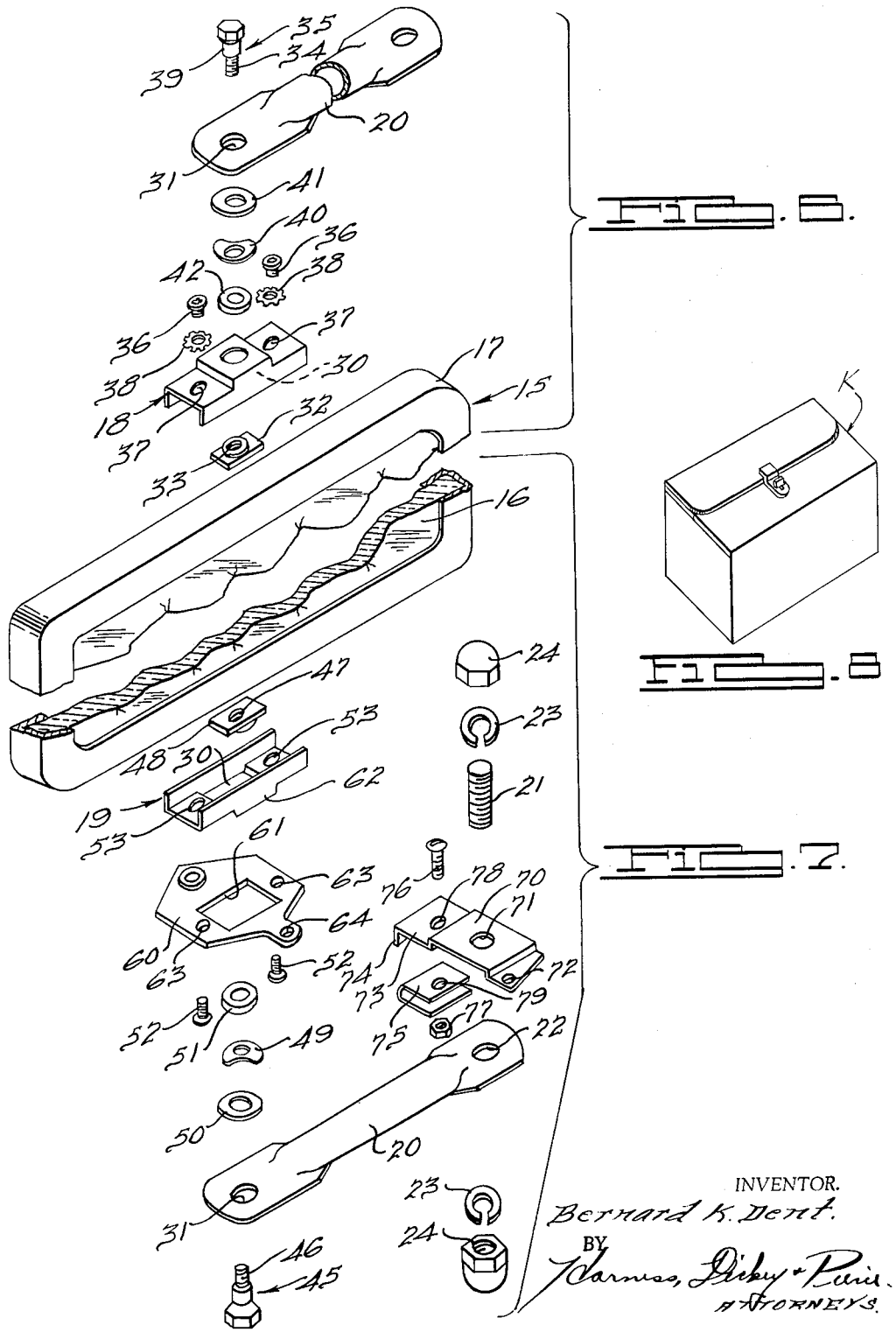

United States Patent Office 3,261,226
Patented July 19, 1966

3,261,226
REMOTE CONTROL FOR REAR VIEW MIRROR
Bernard K. Dent, Greenville, Ohio, assignor to Sheller Manufacturing Corporation, Detroit, Mich., a corporation of Indiana
Filed May 7, 1964, Ser. No. 365,584
4 Claims. (Cl. 74—501)

This invention relates to rear view mirrors for motor vehicles and, more particularly, to means for pivotally supporting the mirror and for mounting a remote control therefor.

One of the important objects of the invention is to provide a conversion kit comprising the parts necessary to convert a stationary mirror to an adjustable mirror together with means for adjusting the position of the mirror from a point remote therefrom.

Another important object of this invention is to provide a conversion kit of this type which is so reduced in the number and character of its component parts as to approach the ultimate in structural simplicity.

Another object of the invention is to provide a device of this type wherein its structural simplicity creates an economy in its manufacture, installation and maintenance.

These and other objects of the invention are attained by providing a conversion kit containing means for pivotally supporting the mirror on the brackets usually provided on the vehicle for supporting the rear view mirror. The kit will contain pivotal mountings for the rear view mirror provided with friction means to resist untoward movement of the mirror; an operating bracket for attachment to the mirror whereby rotative adjusting movement may be imparted to the mirror; a control cable; a return spring for the mirror; and a control cable clamp whereby the mirror may be rotatively adjusted about its pivotal mounting from a remote point within the vehicle.

The aforesaid parts are of simple construction and readily interfit so that they may be quickly and easily assembled without requiring special tooling or highly skilled labor.

The various objects and advantages, and the novel details of construction of one commercially practical embodiment of the invention, will become more apparent as this description proceeds, especially when considered in connection with the accompanying drawings, in which:

FIGURE 1 is a fragmentary perspective view of a motor vehicle showing a rear view mirror embodying the present invention attached thereto;

FIGURE 2 is a fragmentary detail side elevational view of the upper pivotal mounting of the mirror;

FIGURE 3 is a similar view of the lower pivotal mounting of the mirror;

FIGURE 4 is an enlarged detail sectional view taken on line 4—4 in FIGURE 1;

FIGURE 5 is a top plan view of the lower pivotal mounting and operating means for the mirror;

FIGURE 6 is an exploded view of the parts of the upper pivotal mounting for the mirror enclosed in the circle "A" in FIGURE 1;

FIGURE 7 is a similar view of the lower pivotal mounting parts enclosed in the circle "B" in FIGURE 1; and FIGURE 8 is a perspective view of a kit-like container in which the several parts are packaged.

This invention relates to a conversion kit whereby stationary mirrors may be converted to adjustable mirrors provided with a remote control. While the invention is adapted for use on all types of vehicles, it finds particularly utility in connection with trucks, buses and the like having outside mirrors which either are stationary or must be adjusted by reaching through the vehicle window to adjust the same.

The invention contemplates the packaging in a kit or the like K of the parts necessary to convert a stationary mirror to an adjustable remote controlled mirror. The parts necessary to obtain such a conversion are included in a kit-like container and are dispensed as a package. The parts are of simple construction and readily interfit so that they may be quickly and easily assembled without requiring special tooling or highly skilled labor. In effect, the device is in the nature of a "do-it-yourself" unit which may be quickly and easily installed by unskilled labor and may be sold over the counter as a complete package.

Reference may now be had to the accompanying drawings, wherein the reference character 10 indicates a motor vehicle provided with a cab having projecting therefrom a pair of upper mirror supporting brackets 11 and a pair of lower mirror supporting brackets 12. These brackets usually project rigidly from the vehicle body 10 and the outer free ends thereof are provided with aligned pivot openings 13, by means of which the conventional rear view mirror is usually attached. The reference character 14 indicates a diagonally disposed brace extending from the upper supporting brackets 11 to the lower supporting brackets 12.

Ordinarily, a rear view mirror assembly 15 is attached to the aligned pivot openings 13 in the upper and lower brackets 11 and 12. This mirror assembly consists of a mirror glass 16 usually surrounded by a metal frame 17.

The mirror assembly 15, in conventional vehicles, is secured to the aligned pivot openings 13 and is either rigidly attached to the support brackets 11 and 12 or is mounted thereon for limited pivotal movement by hand. In order to adjust the rear view mirror 15, the operator must reach through the adjacent window and manually adjust the mirror assembly. The mirror assembly 15 is usually provided with upper and lower brackets 18 and 19 which, in the vernacular used in the following specification, will be called pivot supporting brackets. These brackets 18 and 19 are used to attach the mirror assembly to the supporting brackets 11 and 12.

In the embodiment of the invention herein shown, each kit would contain a pair of extension arms 20 which at one end are connected to the supporting brackets 11 and 12 and at their outer free ends support the mirror assembly 15. These are employed principally for the purpose of locating the mirror further away from the body or cab of the truck so that the mirror may better focus on the road to the rear of the vehicle. It will be understood, however, that if the bracket arms 11 and 12 are long enough, the extension arms 20 will not be employed.

If extension arms 20 are employed, they are connected to the pivot openings 13 of the supporting brackets 11 and 12 by means of a threaded stud 21, see FIGURES 4 and 7, which passes through the aligned apertures 13 and through an aperture 22 in the end of the extension arm 20 and through the brace 14. Spring washers 23 are provided adjacent the top and bottom of the stud 21 and cap nuts 24 are secured to the free ends of the stud 21. Thus, each extension arm 20 is rigidly secured to the supporting brackets 11 and 12. Each of the pivot supporting brackets is usually provided with a laterally offset recessed portion 30 and the top or upper pivotal connection consists of the parts best shown in FIGURES 2 and 6.

The end of the arm 20, if an arm is used, is provided with an aperture 31 and a tapped block 32 is lodged within the recess 30 in the pivot supporting bracket 18. This block 32 is provided with a tapped opening 33 adapted to receive the threaded end 34 of a pivot stud 35. The pivot supporting bracket 18 is secured to the frame 17 of the mirror assembly by means of attaching screws 36. The screws 36 pass through apertures 37 in the pivot supporting bracket and are threaded into the frame 17 of the mirror assembly, lock washers 38 being provided between the heads of the screws 36 and the member 18. The pivot stud 35 is provided with a nonthreaded round portion 39 which engages in the aperture 31 of the arm 20, when the arms 20 are used. Otherwise, this rounded portion of the pivot stud would engage the openings 13 in the ends of the supporting brackets 11.

It is preferable to provide the upper and lower pivots for the rear view mirror assembly 15 with friction pivots and for this purpose, a spring washer 40 is provided in the pivot assembly, which is located between a flat washer 41 and a spacer 42.

When the parts just described are properly assembled, the rear view mirror assembly is pivotally mounted on the end of the upper extension arm 20 and a friction pivot is provided so that the rear view mirror assembly will not swing loosely about its pivot.

The lower extension arm 20 is also provided with an aperture 31 to receive a pivot stud 45, the threaded end 46 of which engages in a tapped opening 47 provided in the block 48 lodged in the recess 30 of the lower pivot supporting bracket 19. This pivotal connection comprises a spring washer 49 interposed between a flat washer 50 and a spacer 51. In this form of construction, longer screws 52 are employed which pass through openings 53 in the pivot supporting bracket 19 to secure this bracket to the frame 17 of the mirror assembly 15.

In addition to the above described construction, one of the pivots, preferably the lower pivot, is provided with an operating bracket 60 which is provided with an irregularly shaped, here shown as a rectangular, opening 61. This opening embraces the outer surface of the extension 62 in the lower pivot supporting brackets 19 which provides the recess 30. This nonrotably connects the operating bracket 60 to the lower pivot supporting bracket 19, as well as to the mirror assembly, as will be obvious. The connection is made more secure by passing the screws 52 through openings 63 in the operating bracket 60.

The operating bracket 60 is provided at one side thereof with an opening 64 to which one end of a spring 65, yet to be referred to, is connected. Diametrically opposite the aperture 64, the operating bracket 60 is provided with a stud 66 through which the end of an operating cable 67, yet to be referred to, extends. The end of the cable 67 is headed as at 68 so as to prevent its withdrawal from the stud 66. The stud 66 is located in a laterally extending portion 60a of the operating bracket 60 and the aperture 64 is formed in an arm-like extension 64b of the bracket 60. By spacing the aperture 64 and the stud 66 from the axis of pivotal rotation of the rear view mirror, the leverage applied by the actuating cable 67 and the spring 65 is increased. The reference character 69 indicates the usual sheath for the operating cable 67.

Thus, when the cable is actuated, it will tend to oscillate or rotate the operating bracket 60, which, as described, is rigidly connected to the lower edge of the mirror assembly, so that the mirror will be rotatably adjusted on its upper and lower pivot assemblies and thus moved to the position desired by the operator of the vehicle.

Secured to the other end of the lower extension arm 20 is a control bracket 70. This control bracket is provided with a centrally located opening 71 through which one of the threaded studs 21 extends. The control bracket 70 is rigidly secured in place by the washer 23 and cap nut 24.

One end of the control bracket 70 is provided with an opening 72 in which the other end of the spring 65 engages. The opposite end of the control bracket is provided with an offset portion 73 provided with a laterally extending flange 74 to receive a U-shaped cable clamp 75. The sheath of the operating cable 67 extends through the bight of the cable clamp 75 and the cable clamp is secured to the control bracket by means of a screw 76 which passes through aligned apertures 78 and 79 in the control bracket and cable clamp, respectively, and a nut 77. This is shown in FIGURE 7 and in plan view in FIGURE 5.

It will be noted that the cable 67 is supported by the cable clamp 75 at a point remote or spaced from the pivotal axis of the mirror assembly so that the portion of the operating cable extending between the clamp 75 and the stud 66 will extend in practically a straight line at substantially right angles to the arm portion 60a of the operating bracket 60.

The reference character 80 indicates a wall of the vehicle 10 which is provided with an aperture 81 through which the end of the cable 67 extends. A rubber grommet or other sealing means 82 may be provided surrounding the aperture 81. Inside the vehicle, there is a lever 83 pivoted as at 84 and connected to the operating cable as at 85 so that movement of the lever 83 will move the cable 67 longitudinally and rock the mirror assembly 15 about its pivot to adjust the same according to the desires of the vehicle operator.

The spring 65 is tensioned when the mirror is moved to one extreme position and tends to return the mirror to its normal position substantially as shown in FIGURES 1 and 5. It will be remembered that the pivotal mountings for the mirror at the upper and lower ends thereof are provided with spring washers so that the pivots are under tension to resist any untoward movement of the rear view mirror. The friction of the cable 67 at its sheath 69 also tends to restrict movement of the rear view mirror so that it will always be held in the position to which it has been adjusted.

The parts of this device are of such structural simplicity as to create an economy in the manufacture and maintenance of the device. Many of the parts may be made from sheet metal stampings and many of the other parts are simple screw machine parts. The simplicity of the parts and the fact that they readily interfit make it possible to quickly and easily assemble the device without requiring any special tools or the services of highly skilled labor. The parts are small and may be disposed in a kit-like container and dispensed as a package.

While one commercially practical embodiment of the invention has been described and illustrated herein somewhat in detail, it will be understood that various changes may be made as may come within the purview of the accompanying claims.

What is claimed is:

1. In a rear view mirror assembly for a vehicle provided with supporting brackets projecting therefrom having pivot openings in the free ends thereof, and a mirror assembly, including a frame and pivot supporting brackets attached to said frame, that improvement which comprises, pivot means carried by said pivot supporting brackets for rotatively supporting said mirror assembly including means engaging said pivot openings, an operating bracket provided with an opening embracing a portion of one of said pivot supporting brackets to nonrotatively connect the same to said mirror assembly, an operating cable connected at one end to said operating bracket to adjust said mirror assembly, a control bracket secured to one of said supporting brackets, a cable clamp secured to said control bracket and engaging said cable to support the same at a point remote from said mirror assembly, means within the vehicle remote from said mirror assembly for actuating said cable, and a spring having one end connected to said operating bracket and the other end connected to said control bracket to resiliently resist adjustment of said mirror assembly in one direction.

2. A device as described in claim 1 in which the pivot means comprises friction disks to resist rotation of said mirror assembly.

3. As an article of manufacture, a conversion kit for converting a conventional vehicle rear view mirror into a remotely controlled rear view mirror for use on vehicles provided with supporting brackets projecting therefrom having pivot openings in the free ends thereof and pivot supporting brackets carried by the mirror assembly comprising, pivot assemblies connected to said mirror assembly through said pivot supporting brackets and engaging the pivot openings in said supporting brackets, an operating bracket having an aperture embracing a portion of one of said pivot supporting brackets to nonrotatively connect the same thereto, screws connecting said operating bracket to said mirror assembly for pivotal rotative movement therewith, a control bracket secured to one of said supporting brackets, a cable clamp secured to said control bracket, an operating cable connected at one end to said operating bracket and engaging said cable clamp at a point remote from said mirror assembly, a cable actuating means positioned within the vehicle and connected to the other end of said cable, and a spring having one end connected to said operating bracket and the other end connected to said control bracket, all of said parts being disposed in a kit-like container and dispensed as a package.

4. A device as described in claim 3 in which said kit includes a pair of extension arms connected to the pivot openings of said supporting brackets and to the pivot assemblies of said mirror assembly.

References Cited by the Examiner
UNITED STATES PATENTS

| | | | |
|---|---|---|---|
| 1,795,267 | 3/1931 | Stuart | 74—501 |
| 2,626,539 | 1/1953 | Peterson | 88—93 |
| 2,751,817 | 6/1956 | Lapekas | 88—93 |
| 2,843,018 | 7/1958 | Cooper et al. | 88—98 |
| 2,933,942 | 4/1960 | Boylan et al. | 74—501 |
| 3,204,473 | 9/1965 | Thompson | 74—96 |

MILTON KAUFMAN, *Primary Examiner.*

HALL C. COE, BROUGHTON G. DURHAM,
*Examiners.*